(12) United States Patent
Foulser et al.

(10) Patent No.: US 9,043,226 B1
(45) Date of Patent: May 26, 2015

(54) METHOD AND SYSTEM FOR CREDITING A RETAILER FOR AN INTERNET PURCHASE

(71) Applicant: GOOGLE INC., Mountain View, CA (US)

(72) Inventors: David E. Foulser, Melrose, MA (US); Daniel Joseph Clancy, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 83 days.

(21) Appl. No.: 13/846,789

(22) Filed: Mar. 18, 2013

Related U.S. Application Data

(63) Continuation of application No. 13/589,068, filed on Aug. 17, 2012, now Pat. No. 8,412,586, which is a continuation of application No. 13/206,350, filed on Aug. 9, 2011, now Pat. No. 8,255,283, which is a continuation of application No. 12/794,164, filed on Jun. 4, 2010, now Pat. No. 8,069,088.

(51) Int. Cl.
*G06Q 30/00* (2012.01)
*G06Q 30/06* (2012.01)

(52) U.S. Cl.
CPC .................................. *G06Q 30/0613* (2013.01)

(58) Field of Classification Search
USPC ........................................................ 705/26.1
See application file for complete search history.

(56) References Cited

U.S. PATENT DOCUMENTS

| | | |
|---|---|---|
| 2002/0085025 A1* | 7/2002 | Busis et al. .................... 345/738 |
| 2009/0187489 A1 | 7/2009 | Mallick et al. |
| 2011/0029399 A1* | 2/2011 | Asher et al. .................. 705/26.1 |

OTHER PUBLICATIONS

Airapetian, M., Office Action issued in co-pending U.S. Appl. No. 12/794,164, filed Jun. 4, 2010, pp. 1-8, Feb. 22, 2011.
Airapetian, M., Office Action issued in co-pending U.S. Appl. No. 13/206,350, filed Aug. 9, 2011, pp. 1-8, Feb. 15, 2012.
Karp, G., Capture Rebates with Web Portals (Second Edition), 2006, *Morning Call*, pp. 1-3, Dec. 3, 2006.

* cited by examiner

*Primary Examiner* — Mila Airapetian
(74) *Attorney, Agent, or Firm* — Johnson, Marcou & Isaacs, LLC

(57) ABSTRACT

Systems and methods for crediting a retailer for an online purchase made by a consumer while the consumer is located within or in the proximity of a store location of the retailer are provided. After browsing a retail location for a product, a consumer can purchase the product from an Internet merchant different than that of the retailer using a mobile or networked client device. The client device can include a module for determining the location of the client device at the time of purchase and include the location information with information used to complete the purchase of the product. This location information can include an actual geographic location, a store identifier, or a retailer identifier. The online merchant can match the location information with retailer information to determine whether a credit for the purchase should be given to a retailer.

32 Claims, 4 Drawing Sheets

METHOD AND SYSTEM FOR CREDITING A RETAILER FOR AN INTERNET PURCHASE

CROSS REFERENCE TO RELATED APPLICATIONS

This patent application is a continuation of and claims priority to U.S. patent application Ser. No. 13/589,068, now U.S. Pat. No. 8,412,586, filed Aug. 17, 2012 and entitled "Method and System for Crediting a Retailer for an Internet Purchase," which is a continuation of U.S. patent application Ser. No. 13/206,350, now U.S. Pat. No. 8,255,283, filed Aug. 9, 2011 and entitled "Method and System for Crediting a Retailer for an Internet Purchase," which is a continuation of U.S. patent application Ser. No. 12/794,164, now U.S. Pat. No. 8,069,088, filed Jun. 4, 2010 and entitled "Method and System for Crediting a Retailer for an Internet Purchase." The entire contents of each of the above-identified applications are hereby fully incorporated herein by reference.

TECHNICAL FIELD

The invention relates generally to online shopping. In particular, the invention relates to crediting a retailer for purchases made by consumers via an Internet Web site of a merchant different than that of the retailer while the consumer is located within or in the proximity of one of the retailer's locations.

BACKGROUND

Retail bookstores and other retailers provide a convenient environment in the form of physical retail store locations for consumers to browse products prior to making a purchase. The store locations typically have many different products on display so that a consumer can examine and compare products before making a purchasing decision. Many of these retailers make most, if not all, of their revenue from in store sales.

However, the advent of wireless electronic devices, such as smartphones and mobile computers, allow consumers to browse products in a retail store location but purchase the product outside of the retailer's environment. For example, a consumer shopping for books at a bookstore may find a book to purchase. While in the bookstore, the consumer may use a wireless electronic device to browse an Internet Web site of a different merchant to purchase the same book or a digital version of the book. In this example, although the retailer provided the shopping environment that led to the book purchase, the retailer would not share in the revenue or profits of the purchase. As the percentage of Internet purchases continues to grow and the number of consumers carrying wireless electronic devices also continues to grow, retailers having physical retail locations need a means to capitalize on in-store Internet purchases in order to avoid losing significant revenue.

SUMMARY

One aspect of the present invention provides a computer program product for providing a credit to a retailer for a purchase made by a consumer from an Internet merchant. The computer program product can include a computer-readable medium including computer-readable program code for receiving information identifying a product for purchase; computer-readable program code for receiving information identifying a location of a device used by the consumer to purchase the product; computer-readable program code for determining whether the location of the device corresponds to a retail location of the retailer; and computer-readable program code for providing a credit to the retailer based on a determination that the location of the device corresponds to a retail location of the retailer.

Another aspect of the present invention provides a system for providing a credit to a retailer for a purchase made by a consumer from an Internet merchant. This system can include a computer system for receiving information identifying a product for purchase and information identifying a location of a device used by the consumer to complete the purchase; a data storage unit coupled to the computer system for storing information identifying a plurality of retailers; and a retailer crediting module coupled to the computer system for determining whether the location of the device corresponds to a retail location of the retailer and for providing a credit to the retailer based on a determination that the location of the device corresponds to a retail location of the retailer.

Another aspect of the present invention provides a method for providing a credit to a retailer for a purchase made by a consumer from an Internet merchant. This method includes the steps of receiving from a client device associated with the consumer at a computer system associated with the Internet merchant information identifying a product for purchase; receiving from the client device at the computer system information identifying a location of the client device used by the consumer to complete the purchase; determining, by the computer system, whether the location of the client device corresponds to a retail location of the retailer; and associating, by the computer system, a credit to the retailer based on a determination that the location of the client device corresponds to a retail location of the retailer.

Another aspect of the present invention provides a computer-implemented method for crediting a retailer for a purchase. This method includes the steps of receiving, at a computer system, information identifying a product a consumer intends to purchase; receiving, at the computer system, information identifying a location of the consumer; completing, by the computer system, the purchase of the product; determining, by the computer system, whether to credit a retailer for the purchase by determining whether the location of the consumer corresponds to a retail location associated with the retailer; and in response to a determination that the location of the consumer corresponds to a retail location, applying, by the computer system, a credit to the retailer.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

DETAILED DESCRIPTION OF EXEMPLARY EMBODIMENTS

Exemplary embodiments of the invention are provided. These embodiments include systems and methods for crediting a retailer for purchases made by consumers via an Internet Web site of a merchant different than that of the retailer while the consumer is located within or in the proximity of one of the retailer's locations. After browsing a retail location for a product, a consumer can purchase the product from an Internet merchant different than that of the retailer using a mobile or networked client device. The client device can include hardware or software for determining the location of the client device at the time of purchase and include the location information with information used to complete the purchase of the product. This location information can include an actual geographic location, a store identifier, or a retailer identifier. After the transaction is completed, the Internet merchant can match the location information with retailer information to determine whether a credit for the purchase should be given to a retailer.

Embodiments of the invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed invention will be explained in more detail in the following description, read in conjunction with the figures illustrating the program flow.

Figure 1:
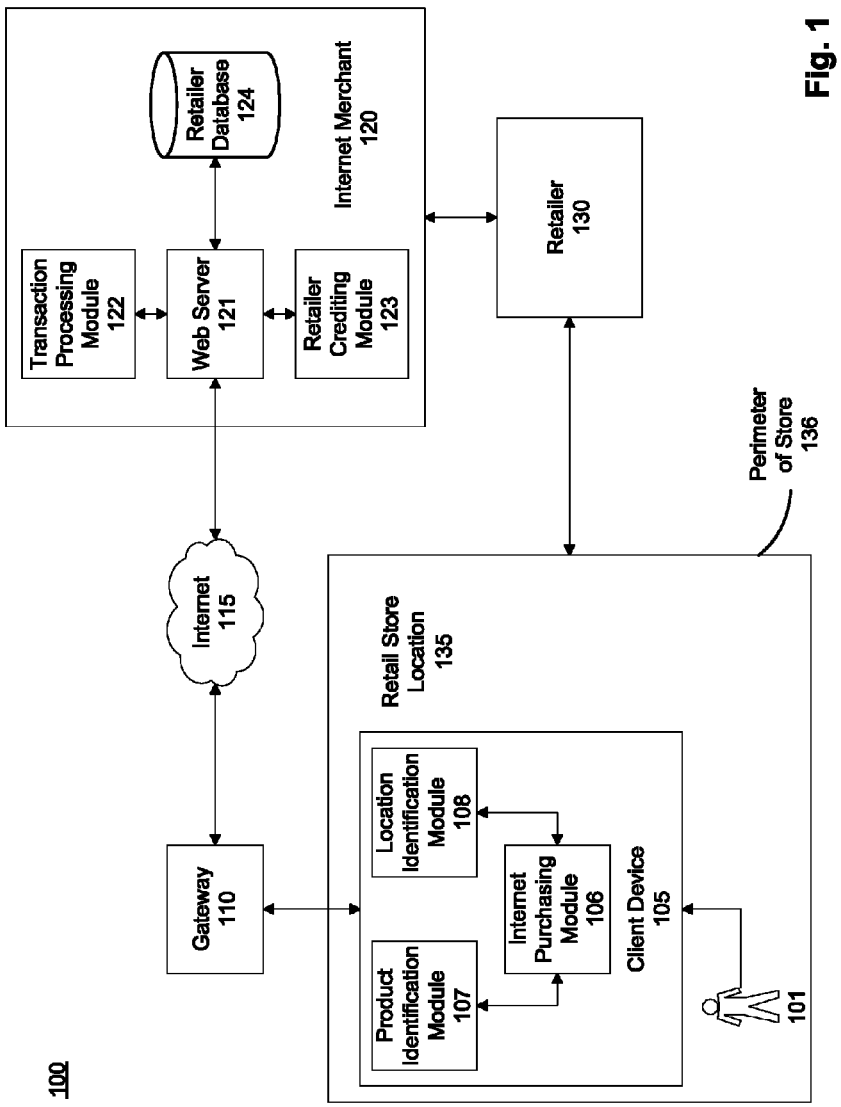
FIG. 1 is a block diagram depicting a system for crediting a retailer for purchases made by consumers via an Internet Web site of a merchant different than that of the retailer while the consumer is located within or in the proximity of one of the retailer's locations in accordance with certain exemplary embodiments.

A method and system for crediting a retailer 130 for purchases made by a consumer 101 via an Internet Web site of a merchant 120 different than that of the retailer 130 while the consumer 101 is located within or in the proximity of one of the retailer's store locations 135 will now be described with reference to FIGS. 1-4, which depict representative or illustrative embodiments of the invention. FIG. 1 is a block diagram depicting a system 100 for crediting a retailer 130 for purchases made by a consumer 101 via an Internet Web site of a merchant 120 different than that of the retailer 130 while the consumer 101 is located within or in the proximity of one of the retailer's locations 135 in accordance with certain exemplary embodiments. Although the exemplary embodiments are described in terms of a retailer 130 having a retail store location 135, one skilled in the art would appreciate that the present invention can also be used for other types of businesses, such as wholesalers and service providers.

Referring to FIG. 1, the exemplary system 100 includes a retailer 130 having a physical retail store location 135, such as a bookstore, music store, department store, kiosk or store location in a mall. Consumers, such as consumer 101, can browse the store location 135 for products or services offered by the retailer 130. As used throughout the specification, the term "products" should be interpreted to include tangible products and intangible products, as well as services. After the consumer 101 finds a product for purchase, the consumer 101 can either purchase the product from the retailer 130 at the store location 135 using conventional methods (e.g., checkout terminal) or purchase the product or a similar product from an Internet merchant 120 different than that of the retailer 130 using a client device 105 in communication with the Internet 115.

The client device 105 can include a portable computer (e.g., notebook or netbook computer), mobile phone (e.g., smartphone), personal digital assistant ("PDA"), or other device having Internet or other communication capabilities. The client device 105 can include an Internet purchasing module 106, a product identification module 107, and a location identification module 108, each of which will be described in more detail below. The client device 105 can communicate with the Internet 115 by way of a gateway 110. The gateway 110 can include a mobile phone network that provides mobile Internet capabilities for smartphones. The gateway 110 can also include a Wi-Fi network or wireless local area network ("WLAN") that provides a wireless Internet connection for Wi-Fi enabled devices, such as portable computers, smartphones, and PDAs. The Wi-Fi network may be provided by the retailer 130 in the store location 135 or by an external provider. The gateway 110 may also include a wired Internet connection provided at the store location 135. For example, the store location 135 may provide a plug-in connection for a consumer 101 to connect a personal laptop. Alternatively or additionally, the store location 135 may provide a kiosk having a computer for the consumer 101 to connect to the Internet 115.

The Internet purchasing module 106 communicates with a Web server 121 of the Internet merchant 120 to mediate the purchase of products by the consumer 101 from the Internet merchant 120. The Internet purchasing module 106 can be embodied as a stand-alone software application installed on and executed by the client device 105. Alternatively, the Internet purchasing module 106 can be embodied as a plug-in application or application programming interface ("API") executing in an Internet web browser application. In a web browser embodiment, the Internet purchasing module 106 may be delivered to the client device 105 as part of an Internet Web page downloaded from the Web server 121 to the client device 105. The Internet purchasing module 106 provides a user interface (not shown) to the consumer 101 to complete a purchase from the Internet merchant 120. This user interface can provide standard purchasing functions, such as displaying products for purchase, accepting a method of payment, and confirming the transaction. The user interface can also allow the consumer 101 to browse and research products prior to purchasing.

The Internet purchasing module 106 communicates with the product identification module 107 and the location identification module 108. The product identification module 107 assists the consumer 101 with identifying a product for purchase. In certain exemplary embodiments, the product identification module 107 includes a scanner installed on or coupled to the client device 105 for scanning a barcode, such as a universal product code ("UPC"), a two-dimensional barcode, a Quick Response code ("QR code"), a European Article Numbering ("EAN") barcode, or other type of barcode. In certain exemplary embodiments, an in-store poster or other signage associated with a product may have a barcode or other scannable image or graphic printed or attached thereon for the consumer 101 scan with the client device 105. In certain exemplary embodiments, the product identification module 107 includes a user interface for receiving a textual description, title, or search terms associated with the product from the consumer 101. In certain exemplary embodiments, the product identification module 107 includes a radio frequency identification ("RFID") reader installed on or coupled to the client device 105 for reading RFID tags associated with a product. In certain exemplary embodiments, the product identification module 107 includes a camera installed on or coupled to the client device 105 for taking a picture of a barcode or in-store signage associated with a product, or for taking a picture of the product itself.

After obtaining information identifying a product for purchase, the product identification module 107 communicates the information to the Internet purchasing module 106. The Internet purchasing module 106 can then use the information identifying the product to determine if that product or a similar product is sold by the Internet merchant 120. In certain exemplary embodiments, the Internet purchasing module 106 can search a database (not shown) or other data storage unit stored on or coupled to the client device 105 for a matching or similar product offered by the Internet merchant 120. Alternatively or additionally, the Internet purchasing module 106 can communicate the information identifying the product to the Web server 121 and the Web server 121 can search for a matching or similar product offered by the Internet merchant 120. The Internet purchasing module 106 can then display any information associated with matching or similar products to the consumer 101 via the client device 105.

The location identification module 108 retrieves information identifying the location of the client device 105 and thus, the consumer 101 when the consumer 101 makes a purchase using the Internet purchasing module 106. In certain exemplary embodiments, the client device 105 includes a global positioning system ("GPS") receiver (not shown) or other real-time location identification system. The location identification module 108 can communicate with the GPS receiver to determine the location of the client device 105. In certain exemplary embodiments, the location identification module 108 can include a scanner for scanning in-store posters or signage having information identifying the retailer 130 and/or the retailer store location 135. This information can include the name of the retailer 130, a code for the retailer 130, a store name, or a store code. In certain exemplary embodiments where the store location provides a Wi-Fi gateway 110, the location identification module 108 can obtain the network address of the Wi-Fi gateway 110. After obtaining information identifying the location of the client device 105, the location identification module 108 communicates the information to the Internet purchasing module 106.

The Internet purchasing module 106 can communicate the information identifying the product for purchase, the information identifying the location of the client device 105, and other transactional information (e.g., form of payment, method of delivery, etc.) to the web server 121 of the Internet merchant 120 to mediate the purchase of the product. The Web server 121 can include or be coupled to a transaction processing module 122. The transaction processing module 122 can receive the information identifying the product and the other transactional information and use this information to mediate the purchase of the product.

In certain exemplary embodiments, the transaction processing module 122 may include or be coupled to a third party payment processor (not shown). Consumers 101 having an account with a third party payment processor can make purchases from Internet merchants 120 without disclosing sensitive payment information (e.g., credit card number) to the Internet merchant 120. Instead, the consumer 101 provides payment information for one or more financial accounts (e.g., checking account, credit card account, etc.) to the third party payment processor for use in Internet transactions. When purchasing a product from an Internet merchant 120 that accepts payments via the third party payment processor, the consumer 101 can select from one of the financial accounts to pay for the product. The third party payment processor can then debit the selected account for the amount of the purchase and credit this amount to an account of the Internet merchant 120. Examples of third party payment processors include GOOGLE CHECKOUT and PAYPAL.

The Web server 121 of the Internet merchant 120 can include or be coupled to a retailer crediting module 123. The retailer crediting module 123 can determine if a purchase from the Internet merchant 120 was received from a consumer 101 located within or in the proximity of a store location 135 of a retailer 130. If so, the retailer crediting module 123 can determine a credit to be distributed to the retailer 130 for the purchase.

The retailer crediting module 123 can determine if a purchase from the Internet merchant 120 was received from a consumer 101 located within or in the proximity of a retailer location 135 by comparing the information identifying the location of the client device 105 with retailer information stored in a retailer database 124 that is stored on or coupled to the Web server 121. This retailer information can include information associated with any number of retailers 130 that are partnered with or otherwise associated with the Internet merchant 120 to receive credit for purchases made from the Internet merchant 120 by a consumer 101 located within or in the proximity of a store location 135 of the retailer 130. Retailer information may include the retailer's 130 name, information identifying particular store locations 135 (e.g., store name/code), GPS coordinates associated with each store location 135, products offered by the retailer 130 for which credits may be received, network address of the store location's 130 Wi-Fi gateway 110, barcodes or other types of codes associated with the retailer 130 and/or a store location of the retailer 130, and any other information associated with retailers 130. The GPS coordinates for each store may include a center point of the store location 135 and a radius. The GPS coordinates can also include coordinates identifying the store location's 135 perimeter 136.

If the information identifying the location of the client device 105 matches information associated with a retailer 130 or a retailer's 130 store location 135, the retailer crediting module 123 can determine whether a credit is appropriate and the amount of the credit to be given to the retailer 130. A credit may be appropriate for certain products only or for purchases made during a certain time period only. For example, if a consumer 101 purchases a product from the Internet merchant 120 that is not offered by the retailer 130 although the consumer 101 is located at one of the retailer's 130 store locations 135, the retailer 130 may not be eligible for a credit. The amount of the credit may also depend on the product(s) purchased. For example, the credit given to a retailer 130 may be a flat fee based on the product or a percentage of the price of the product. Although not shown, the Internet merchant 120 can include one or more credit databases for accruing credits for retailers 130.

Figure 2:
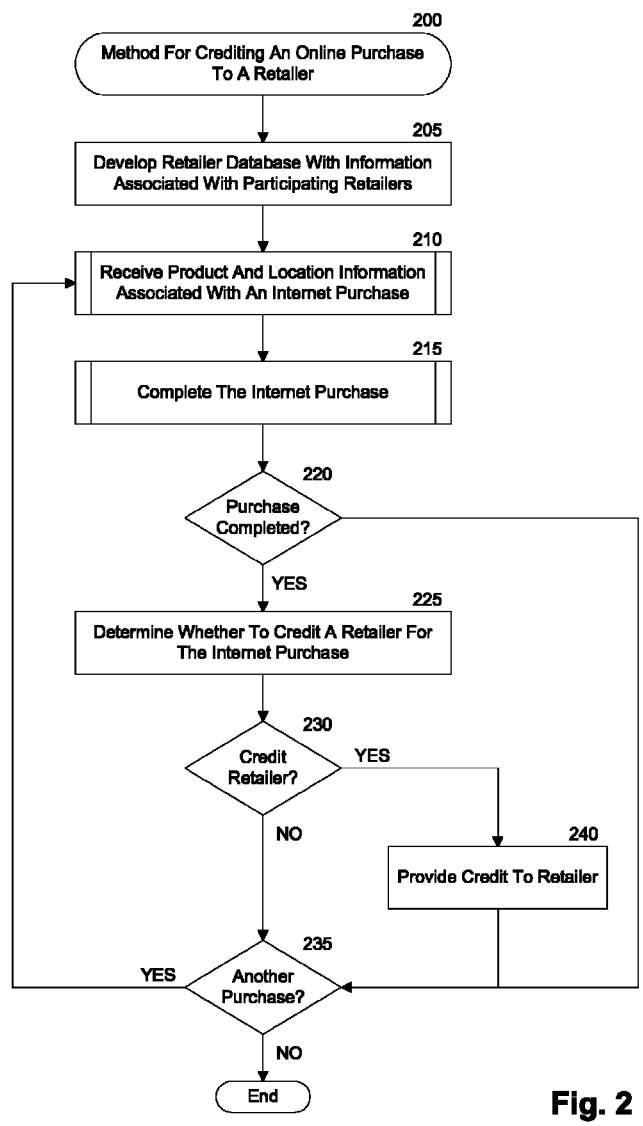
FIG. 2 is a flow chart illustrating a method for crediting a retailer for purchases made by consumers via an Internet Web site of a merchant different than that of the retailer while the consumer is located within or in the proximity of one of the retailer's locations in accordance with certain exemplary embodiments.

FIG. 2 is a flow chart illustrating a method 200 for crediting a retailer 130 for purchases made by a consumer 101 via an Internet Web site of a merchant 120 different than that of the retailer 130 while the consumer 101 is located within or in the proximity of one of the retailer's store locations 135 in accordance with certain exemplary embodiments. The method 200 will be described with reference to FIGS. 1 and 2.

In step 205, a retailer database 124 is developed. The retailer database 124 can include information associated with retailers 130 eligible for a credit for purchases made from the Internet merchant 120 while the consumer 101 is located within or in the proximity of a store location 135 of the retailer 130. For example, the Internet merchant 120 may partner with one or more retailers 130 to provide credits to these retailers 130 for appropriate purchases. In an alternative embodiment, a third party who may be involved in the Internet transaction (such as a payment processor receiving payment from the customer and providing payment to the merchant 120) may partner with the retailers 130 to provide them with credits for appropriate purchases. Information associated with each of the one or more retailers 130 can be stored in the retailer database 124. As described above with reference to FIG. 1, the retailer information can include the retailer's 130 name, information identifying particular store locations 135 (e.g., store name/code), GPS coordinates of each store location 135, products offered by the retailer 130 for which credits may be received, network address of the store location's 130 Wi-Fi gateway 110, bar codes or other types of codes associated with the retailer 130 and/or a store location of the retailer 130, and any other information associated with retailers 130.

In step 210, the Web server 121 receives information associated with an Internet purchase from the client device 105 associated with the consumer 101. This information can include information identifying one or more products for purchase and information identifying the location of the client device 105. The product identification module 107 can receive the information identifying the one or more products for purchase and communicate this information to the Internet purchasing module 106. The location identification module 108 can receive information identifying the location of the client device 105 and communicate this information to the Internet purchasing module 106. After receiving the information associated with the Internet purchase, the Internet purchasing module 106 communicates this information to the Web server 121 of the Internet merchant 120. Step 210 is described in further detail below with reference to FIG. 3.

In step 215, the Web server 121 completes the purchase of the one or more products. The Web server 121 can use the information identifying each of the one or more products to search a product database (not shown) for a matching or similar product offered by the Internet merchant 120. For example, if the consumer 101 is attempting to purchase a musical compact disc ("CD"), the Web server 121 can search for that CD or for a downloadable version of the CD. After finding a matching or similar product, the Web server 121 can present information associated with the matching or similar product to the consumer 101 via a user interface, such as an Internet Web site, at the client device 105. The consumer 101 can then decide whether to purchase the matching or similar product. If the consumer 101 decides to purchase the matching or similar product, the Internet purchasing module 106 can prompt the consumer 101 for payment information, delivery information, and any other information necessary to complete the transaction. After receiving this transaction information, the transaction processing module 122 can complete the transaction. Step 215 is described in further detail below with reference to FIG. 4.

In step 220, if the consumer purchased a product from the Internet merchant 120, the method 200 proceeds to step 225. Otherwise, the method 200 proceeds to step 235.

In step 225, the retailer crediting module 123 determines whether to credit a retailer 130 for the purchase. The retailer crediting module 123 can receive the information identifying the purchased product(s) and the information identifying the location of the client device 105 from the Web server 121. The retailer crediting module 123 can compare the information identifying the location of the client device 105 to the retailer information stored in the retailer database to 124 determine if the client device 105 was located within or in the proximity of a retailer location 135 when the purchase was completed.

In certain exemplary embodiments, the retailer crediting module 123 compares GPS coordinates obtained by the location identification module 108 to GPS coordinates of one or more store locations 135 stored in the retailer database 124. The GPS coordinates stored in the retailer database 124 can include a center or near center coordinate and a radius or coordinates defining a perimeter 136 of the store locations 135. If the GPS coordinates obtained by the location identification module 108 are located within or proximal to a store location 135 of a retailer 130, that retailer 130 may be eligible for a credit.

In certain exemplary embodiments, the retailer crediting module 123 compares information identifying a retailer 130 or store location 135 obtained from in-store posters or signage to the retailer information stored in the retailer database 124. This information can include the name of the retailer 130, a code for the retailer 130, a store name, a store code, or any other information that can be used to identify a retailer 130 or store location 135. If the information matches a retailer 130 or store location 135 of the retailer 130, that retailer 130 may be eligible for a credit.

In certain exemplary embodiments, the retailer crediting module 123 compares a network address of a store location's 135 Wi-Fi gateway 110 to network addresses associated with store locations 135 or retailers 130 in the retailer database 124. If the network address of the store location's 135 Wi-Fi gateway 110 matches a network address associated with a store location 135 or retailer 130 in the retailer database 124, that retailer 130 may be eligible for a credit.

If the retailer crediting module 123 determines that the location of the client device 105 matches information associated with a retailer 130 or a retailer's store location 135, the retailer crediting module 123 can determine whether the retailer 130 is eligible for a credit based on the product(s) purchased. For example, the retailer 130 may not offer one of the product(s) purchased from the Internet merchant and thus may not be eligible for a credit for that purchased product. Or, the Internet merchant 120 and the retailer 130 may agree to award credits for certain products only. Additionally, the Internet merchant 120 may award credits for predefined time periods only.

If the retailer crediting module 123 determines that a retailer 130 should be credited for the purchase, the method 200 branches to step 240. Otherwise, the method 200 branches to step 235.

In step 240, the Internet merchant 120 provides a credit to the retailer 130. In certain exemplary embodiments, the Internet merchant 120 accrues credits for a retailer 130 for a predetermined time period and provides the credits at the end of that time period. For example, the Internet merchant 120 may provide credits to the retailer 130 at the end of each month. As discussed above, in an alternative embodiment, a third party such as a payment processor, may provide the credit to the retailer 130 instead of the merchant 120.

In another embodiment, other entities related to a give transaction—in addition to the retailer 130—may receive credits. For example, a payment processor such as one assisting in the apportionment of credits between merchants 120, retailers 130, and other entities may also receive credits stemming from the purchase. Additionally, a publisher or other manufacturer of the product being purchased (e.g., the publisher of an e-book being purchased) may receive credits. Moreover, retailers also may receive additional credits for facilitating the purchase of goods from an online merchant 120. For example, a retailer 130 that displays signage for an online merchant 120, or a QR code associated with a link to purchase a product from an online merchant 120 can receive additional credits when a consumer 101 purchases the product from an online merchant 120.

In step 235, the Web server 121 determines whether there are more purchases to process. If so, the method 200 returns to step 210. Otherwise, the method 200 ends.

Figure 3:
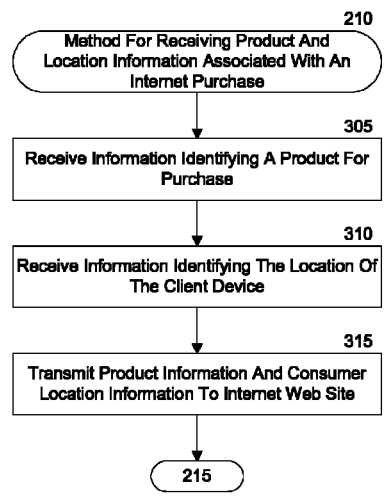
FIG. 3 is a flow chart illustrating a method for receiving product and location information associated with an Internet purchase in accordance with certain exemplary embodiments.

FIG. 3 is a flow chart illustrating a method 210 for receiving product and location information associated with an Internet purchase in accordance with certain exemplary embodiments, as referenced in step 210 of FIG. 2. The method 210 will be described with reference to FIGS. 1 and 3.

In step 305, the product identification module 107 of the client device 105 receives information identifying a product for purchase. In certain exemplary embodiments, the consumer 101 may scan a UPC barcode, an EAN barcode, a two dimensional barcode, or other type of barcode, or an in-store poster or signage associated with a product. In certain exemplary embodiments, the consumer 101 may enter a textual description, title, or search terms associated with the product into a user interface on the client device 105. In certain exemplary embodiments, the consumer 101 may use the product identification module 107 to read an RFID tag associated with the product. In certain exemplary embodiments, the consumer 101 may use a camera installed on or coupled to the client device 105 to take a picture of the product or of a barcode or in-store poster or signage associated with the product.

In step 310, the location identification module 108 of the client device 105 receives information identifying the location of the client device 105. In certain exemplary embodiments, the location identification module 108 can obtain the location from a GPS receiver stored on or coupled to the client device 105. In certain exemplary embodiments, the consumer 101 may scan in-store posters or signage having information identifying the retailer 130 or the store location 135. In certain exemplary embodiments, the location identification module 108 obtains the network address of a Wi-Fi or other Internet gateway 110 associated with the retailer 130 or store location 135 that is used to connect the client device 105 to the Internet 115.

In step 315, the Internet purchasing module 106 obtains the information identifying the product and the information identifying the location of the client device 105 from the product identification module 107 and the location identification module 108. The Internet purchasing module 106 transmits the information identifying the product and the information identifying the location of the client device 105 to the Web server 121. After step 315, the method proceeds to step 215, as referenced in FIG. 2.

Figure 4:
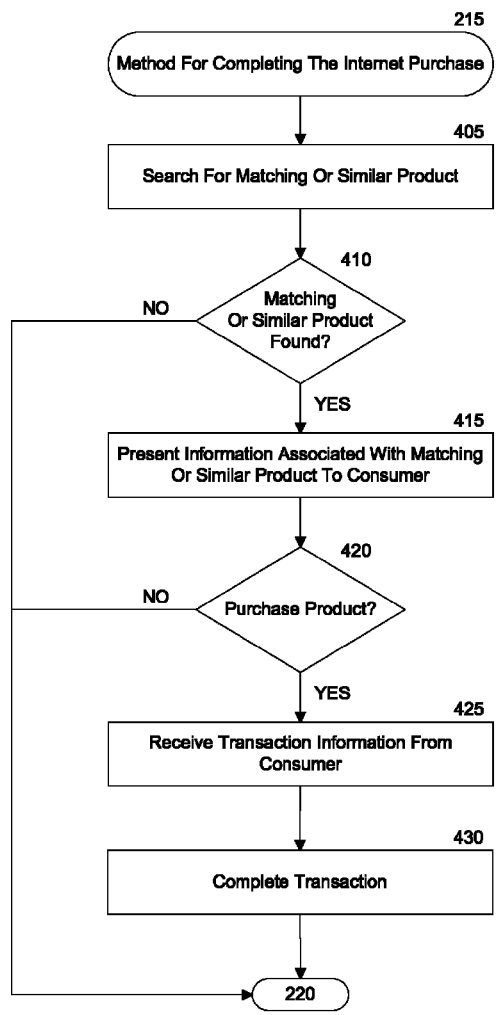
FIG. 4 is a flow chart illustrating a method for completing an Internet purchase in accordance with certain exemplary embodiments.

FIG. 4 is a flow chart illustrating a method 215 for completing an Internet purchase in accordance with certain exemplary embodiments, as referenced in step 215 of FIG. 2. The method 215 will be described with reference to FIGS. 1 and 4.

In step 405, the Web server 121 uses the information identifying the product to search for a product offered by the Internet merchant 120 that matches or is similar to the product that the consumer 101 intends to purchase. For example, if the consumer 101 scanned a UPC code for a movie, the Web server 121 would search for various versions of that movie, such as a DVD, BLU-RAY, VHS, or a downloadable version. The Web server 121 may include or be coupled to one or more product databases having information associated with each product offered by the Internet merchant 120. Alternatively or additionally, the Internet purchasing module 106 can use the information identifying the product to search for a product offered by the Internet merchant 120 that matches or is similar to the product that the consumer intends to purchase prior to transmitting the product and location information to the Web server 121.

In step 410, if a matching or similar product is found, the method 215 proceeds to step 415. Otherwise, the method 215 proceeds to step 220, as referenced in FIG. 2.

In step 415, the Internet purchasing module 106 presents information associated with the matching or similar product to the consumer 101 via the client device 105. This information can include a title, picture, description, versions, price, and any other information associated with the product. The consumer 101 can use the information to determine whether to purchase the product.

In step 420, if the consumer 101 decides to purchase the product, the method 215 proceeds to step 425. Otherwise, the method 215 proceeds to step 220, as referenced in FIG. 2.

In step 425, the Internet purchasing module 106 prompts the consumer 101 for information to complete the transaction. In certain exemplary embodiments, this transaction information includes payment and delivery information. Delivery information can include a shipping address and shipping method if the product is to be shipped to the consumer 101. Or, the delivery information may include instructions to download a digital product. After receiving the transaction information, the Internet purchasing module 106 transmits that transaction information to the Web server 121.

In step 430, the transaction processing module 122 processes the transaction. The transaction processing module 122 can receive the information identifying the product and the other transactional information and use this information to mediate the purchase of the product. After completing the transaction, the transaction processing module 122 can provide a confirmation to the consumer 101 via the Internet purchasing module 106. If the consumer 101 purchased a digital product for download, the Web server 121 can transmit the product to the client device 105 via the Internet 115.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media for execution by a processor, such as a central processing unit, via computer readable memory. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A computer program product, comprising:
a non-transitory computer-readable medium having computer-readable program instructions embodied therein that when executed by a computer perform a method for providing compensation to a first merchant for a purchase from a second merchant, the computer-readable program instructions comprising:
computer-readable program instructions for receiving from a device operated by a consumer at a location associated with a first merchant, product information identifying a product for purchase;
computer-readable program instructions for receiving, from the device, information identifying a location of the device at the time the product information was received;
computer-readable program instructions for determining that the location of the device at the time the product information was received corresponds to a location associated with the first merchant;
computer-readable program instructions for determining that the product was purchased by the consumer from a second merchant different than the first merchant; and
computer-readable program instructions for providing a compensation amount to the first merchant based on a determination that the location of the device at the time the product information was received corresponds to the location associated with the first merchant and a determination that the product was purchased by the consumer from the second merchant.

2. The computer program product of claim 1, wherein the information identifying the location of the device at the time the product information was received comprises at least one of information indentifying a physical location of the device, information identifying the location associated with first merchant, and information identifying the first merchant.

3. The computer program product of claim 2, wherein the information identifying the physical location of the device comprises a location determined by a global positioning system receiver of the device.

4. The computer program product of claim 2, wherein the information identifying the first merchant comprises at least one of a store name and a store code.

5. The computer program product of claim 1, wherein the information identifying the location of the device at the time the product information was received comprises information identifying an Internet gateway that provides access to the Internet for the device to complete the purchase of the product via an Internet web site of the second merchant.

6. The computer program product of claim 1, wherein the device comprises at least one of a portable computer, a mobile telephone, and a personal digital assistant.

7. The computer program product of claim 1, wherein the computer-readable program instructions for determining that the location of the device at the time the product information was received corresponds to the location associated with the first merchant comprises computer-readable program instructions for comparing the information identifying the location of the device at the time the product information was received to information associated with a plurality of merchant locations to determine that the location of the device at the time the product information was received matches one of the plurality of merchant locations.

8. The computer program product of claim 1, further comprising computer-readable program instructions for aggregating a plurality of compensation amounts for the first merchant, the plurality of compensation amounts corresponding to purchases made by consumers from the second merchant while consumers are located in the vicinity of the location associated with the first merchant.

9. A system for providing compensation to a first business for a purchase made from a second business, comprising:
a user mobile computing device associated with a consumer,
the user mobile computing device comprising a processor communicatively coupled to a storage device, wherein the processor executes application code instructions that are stored in the storage device to cause the system to:
transmit information identifying a product for purchase and information identifying a location of the user mobile computing device at a time the product information was transmitted; and
a computing system,
the computing system comprising a one or more processors communicatively coupled to one or more storage devices, wherein the one or more processors execute application code instructions that are stored in the one or more storage devices to cause the system to:
receive from the user mobile computing device, information identifying the product for purchase and information identifying the location of the user mobile computing device at the time the product information was received;
store information identifying a plurality of businesses;
determine that the location of the user mobile computing device at the time the product information was received corresponds to a location associated with a first business;
determine that the product was purchased by the consumer from a second business; and
provide a compensation amount to the first business in response to determining that the location of the user mobile computing device at the time the product information was received corresponds to the location associated with the first business and a determination that the product was purchased by the consumer from the second business.

10. The system of claim 9, wherein the information identifying the location of the user mobile computing device at the time the product information was received comprises at least one of information indentifying a physical location of the user mobile computing device, information identifying the location associated with the first business, and information identifying the first business.

11. The system of claim 10, wherein the information identifying the physical location of the user mobile computing device comprises a location determined by a global positioning system receiver of the user mobile computing device.

12. The system of claim 10, wherein the information identifying the first business comprises at least one of a store name and a store code.

13. A computer-implemented method for compensating a first merchant for a purchase, comprising:
   receiving, by a computer system and from a device operated by a consumer, product information identifying a product;
   receiving, by the computer system, information identifying a location of the consumer at a time when the product information was received;
   receiving, by the computer system, purchase information indicating a purchase of the product by the consumer from a second merchant, the second merchant being distinct from the first merchant;
   determining, by the computer system, that the location of the consumer at the time the product information was received corresponds to a location associated with the first merchant; and
   in response to receiving the purchase information indicating the purchase of the product by the consumer from the second merchant and a determination that the location of the consumer at the time the product information was received corresponds to the location associated with the first merchant, applying, by the computer system, a compensation amount to the first merchant.

14. The method of claim 13, wherein the information identifying the location of the consumer at the time the product information was received comprises at least one of information identifying a physical location of the device of the consumer, information identifying the location associated with the first merchant, and information identifying the first merchant.

15. The method of claim 14, wherein the information identifying the physical location of the consumer is received from a global positioning ("GPS") receiver of the device.

16. The method of claim 15, wherein the step of determining to compensate the first merchant comprises comparing, by the computer system, the location received from the GPS receiver to GPS coordinates that define each of a plurality of merchant locations to determine if the location received from by the GPS receiver is located within the one of the plurality of merchant locations.

17. The method of claim 15, wherein the step of determining whether to compensate the retailer comprises comparing, by the computer system, the location received from the GPS receiver to an area for each of a plurality of merchant locations, the area being defined by a central GPS coordinate and a radius extending from the central GPS coordinate in each direction.

18. The method of claim 13, wherein the information identifying the merchant location comprises at least one of a store name and a store code and the step of determining to compensate the first merchant comprises comparing, by the computer system, the store name or store code to a plurality of store names or store codes to determine that the store name or store code matches one of the plurality of store names or store codes associated with the first merchant.

19. The method of claim 13, wherein the step of determining to compensate the first merchant comprises comparing, by the computer system, the information identifying the location of the consumer at the time the product information was received to information associated with a plurality of merchant locations to determine that the location of the device matches one of the plurality of merchant locations.

20. The method of claim 13, further comprising aggregating, by the computer system, a plurality of compensation amounts for the first merchant, the plurality of compensation amounts corresponding to purchases made by consumers from the second merchant while the consumers are located at the location associated with the first merchant.

21. The method of claim 13, wherein the second merchant is a competitor of the first merchant.

22. The method of claim 13, wherein the product information is obtained by the device by taking a picture of a barcode or in-store signage associated with a product.

23. The method of claim 13, wherein the product information is obtained by the device by receiving an input into the device of a textual description, title, or search terms associated with the product.

24. The computer program product of claim 1, wherein the second merchant is a competitor of the first merchant.

25. The computer program product of claim 1, wherein the product information is obtained by the device by taking a picture of a barcode or in-store signage associated with a product.

26. The computer program product of claim 1, wherein the product information is obtained by the device by receiving an input of a textual description, title, or search terms associated with the product.

27. The system of claim 9, wherein the information identifying the location of the device comprises information identifying an Internet gateway that provides access to the Internet for the device.

28. The system of claim 9, wherein the instructions for determining that the location of the device corresponds to the location associated with the first business comprises computer-executable instructions for comparing the information identifying the location of the device to the information identifying the plurality of businesses to determine that the location of the device corresponds to the location associated with the first business.

29. The system of claim 9, wherein the product information is obtained by the device by taking a picture of a barcode or in-store signage associated with a product.

30. The system of claim 9, wherein the product information is obtained by the device by receiving an input of a textual description, title, or search terms associated with the product into the device.

31. The system of claim 9, the computer-executable instructions further comprising computer-executable instructions for aggregating a plurality of compensation amounts for the first business, the plurality of compensation amounts corresponding to purchases made from the second business after receipt of information while the consumers are located in the vicinity of the location associated with the first business.

32. The system of claim 9, further comprising computer-executable instructions for:
   mediating the purchase, wherein a third party payment processor:
   receives a selection of a form of payment from the device;
   debits an account associated with the consumer purchasing the product via the device; and
   compensates an account associated with the second business.

* * * * *